United States Patent
Ocejo Rodriguez et al.

(10) Patent No.: US 12,083,864 B2
(45) Date of Patent: Sep. 10, 2024

(54) TRANSPORT REFRIGERATION UNIT AND CONTROL METHOD

(71) Applicant: THERMO KING LLC, Minneapolis, MN (US)

(72) Inventors: Luis Ocejo Rodriguez, St. Feliu de Llobregat (ES); Vipin Vijayan, Karnataka (IN); Frantisek Zebra, Necin (CZ)

(73) Assignee: THERMO KING LLC, Minneapolis, MN (US)

( * ) Notice: Subject to any disclaimer, the term of this patent is extended or adjusted under 35 U.S.C. 154(b) by 0 days.

(21) Appl. No.: 17/821,531

(22) Filed: Aug. 23, 2022

(65) Prior Publication Data
US 2023/0068594 A1    Mar. 2, 2023

(51) Int. Cl.
*B64D 13/08*    (2006.01)
*B60H 1/32*    (2006.01)

(52) U.S. Cl.
CPC ............ *B60H 1/3205* (2013.01); *B64D 13/08* (2013.01); *B60H 2001/3261* (2013.01); *B60H 2001/3272* (2013.01); *B60H 2001/3273* (2013.01); *B60H 2001/3277* (2013.01)

(58) Field of Classification Search
CPC .......... B60H 1/3205; B60H 2001/3261; B60H 2001/3272; B60H 2001/3273; B60H 2001/3277; B64D 13/00; B64D 13/06; B64D 13/08
See application file for complete search history.

(56) References Cited

U.S. PATENT DOCUMENTS

| | | | |
|---|---|---|---|
| 3,390,539 A | 7/1968 | Miner | |
| 9,809,088 B2 | 11/2017 | Hovel et al. | |
| 9,945,387 B2 | 4/2018 | Balistreri et al. | |
| 10,760,841 B2 | 9/2020 | Boehde | |
| 2007/0033957 A1* | 2/2007 | Taras | F25B 49/02 62/186 |
| 2011/0083454 A1* | 4/2011 | Kopko | F25B 49/027 62/181 |
| 2013/0319020 A1* | 12/2013 | Neeld | F25D 29/00 62/126 |
| 2017/0151859 A1 | 6/2017 | Dykes et al. | |
| 2021/0404686 A1* | 12/2021 | Shen | F24F 11/49 |

FOREIGN PATENT DOCUMENTS

| | | |
|---|---|---|
| DE | 126101 | 6/1977 |
| EP | 1681524 | 12/2011 |
| EP | 2856046 | 11/2020 |

OTHER PUBLICATIONS

Partial European Search Report, issued in the corresponding EP patent application No. 21204961.3, dated Apr. 20, 2022, 13 pages.
Extended European Search Report, issued in the corresponding EP patent application No. 21204961.3, dated Sep. 6, 2022, 12 pages.

* cited by examiner

*Primary Examiner* — Jonathan Bradford
(74) *Attorney, Agent, or Firm* — HSML P.C.

(57) ABSTRACT

A method of controlling an air-cargo transport refrigeration unit to regulate a compressor speed and a condenser fan speed is provided. Also, a method of controlling an air-cargo transport refrigeration unit based on determining an in-flight condition of the refrigeration unit is provided.

16 Claims, 8 Drawing Sheets

TRANSPORT REFRIGERATION UNIT AND CONTROL METHOD

FIELD OF THE INVENTION

The invention relates to a method of controlling an air-cargo transport refrigeration unit. It relates further to a refrigeration unit for an air-cargo transport refrigeration unit comprising a controller configured to carry out such a method.

BACKGROUND OF THE INVENTION

It is known to provide air-cargo transport refrigeration units with a simple non-adaptive control system, typically maintaining constant speed operation of refrigeration components when active, such as a compressor or condenser fan. However, using constant, fixed or non-adaptive settings may lead to sub-optimal performance of an air-cargo transport refrigeration unit, such as inefficient or ineffective cooling of cargo contained with the air-cargo transport refrigeration unit.

SUMMARY

According to a first aspect there is disclosed a method of controlling an air-cargo transport refrigeration unit. The air-cargo transport refrigeration unit comprises an internal cargo space, and a refrigeration cycle comprising a compressor, a condenser for rejecting heat to ambient air and provided with a condenser fan, and an evaporator for cooling the internal cargo space. The method comprises performing a control loop including:
- a compressor speed regulation comprising:
  - monitoring a temperature in the internal cargo space;
  - regulating a speed of the compressor to maintain a rate of temperature decrease in the internal cargo space above a threshold rate during a temperature pull-down mode; and
- a condenser fan regulation comprising:
  - regulating a speed of the condenser fan based on monitoring a discharge pressure of a refrigerant of the refrigeration cycle.

It may be that regulating the speed of the compressor to maintain the rate of temperature decrease comprises evaluating a rate of change of the internal temperature based on temperature signals received from an internal temperature sensor at different times and regulating a speed of the compressor based on the rate of change of the internal temperature.

It may also be that regulating the speed of the compressor to maintain the rate of temperature decrease includes increasing the speed of the compressor based on determining that the rate of temperature decrease is less than the threshold rate.

Further, it may be that regulating a speed of the condenser fan based on monitoring a discharge pressure may also comprise:
- setting the speed of the condenser fan at a high condenser fan speed in response to a determination that the discharge pressure is in a high-pressure range;
- setting the speed of the condenser fan at a low condenser fan speed in response to a determination that the discharge pressure is in a low-pressure range; and
- setting the speed of the condenser fan at an intermediate condenser fan speed in response to a determination that the discharge pressure is in an intermediate-pressure range between the low-pressure range and the high-pressure range.

In addition, it may be that regulating a speed of the condenser fan based on monitoring a discharge pressure further comprises:
- maintaining a prior setting of the condenser fan speed responsive to determining that the discharge pressure is in a transitional range between the low-pressure range and the intermediate pressure range; and/or
- maintaining a prior setting of the condenser fan speed responsive to determining that the discharge pressure is in a transitional range between the intermediate pressure range and the high-pressure range;
- whereby when the discharge pressure is in the transitional range or one of the transitional ranges, the condenser fan pressure regulation is prevented from adjusting an earlier setting corresponding to the discharge pressure being in an adjacent pressure range.

The provision of the transitional range or transitional ranges and the maintenance of a prior setting of the condenser fan speed when the discharge pressure is within the transitional range(s) thereby inhibits the condenser fan speed being adjusted owing to fluctuations in discharge pressure about end points (i.e. bounding thresholds) of a respective low, intermediate or high pressure range. For example, if the discharge pressure was previously in the low-pressure range then the low speed setting may be maintained while the discharge pressures is in the transitional range until the discharge pressure increases to reach the intermediate range. In contrast, if the discharge pressure was previously in the intermediate pressure range then the intermediate speed setting may be maintained while the discharge pressure is in the transitional range until the discharge pressure reaches the low-pressure range.

It may also be that the condenser fan regulation is a second condenser fan regulation, and wherein the control loop further comprises a first condenser fan regulation comprising:
- regulating a speed of the condenser fan based on monitoring a temperature of the ambient air;
- wherein within the control loop, the first condenser fan regulation is performed prior to the second condenser fan regulation, such that a result of the second condenser fan regulation is applied in preference to a result of the first condenser fan regulation.

Further, it may be that the first condenser fan regulation comprises:
- setting the speed of the condenser fan at the high condenser fan speed in response to a determination that the ambient temperature is in a high-temperature range;
- setting the speed of the condenser fan at the low condenser fan speed in response to a determination that the ambient temperature is in a low-temperature range; and
- setting the speed of the condenser fan at the intermediate condenser fan speed in response to a determination that the ambient temperature is in an intermediate-temperature range between the low temperature range and the high temperature range.

It may be that the method further comprises a third condenser fan regulation, comprising:
- evaluating a fault condition of an ambient temperature sensor for monitoring the temperature of the ambient air;
- setting the speed of the condenser fan at the high condenser fan speed when the evaluation is indicative of a fault associated with the ambient temperature sensor wherein within the control loop, the third condenser fan regulation is performed following the second condenser fan regulation, such that a result of the third condenser fan regulation is applied in preference to a result of the second condenser speed regulation.

It may also be that the compressor speed regulation is a first compressor speed regulation, and wherein the control loop further comprises a second compressor speed regulation comprising:

evaluating whether the air-cargo transport refrigeration unit is in an extreme operating condition in which the compressor speed is set to the high compressor speed and the temperature of the internal cargo space is above a threshold setting;

reducing the speed of the compressor when the extreme operating condition is determined;

wherein within the control loop, the first compressor speed regulation is performed prior to the second compressor speed regulation, such that a result of the second compressor speed regulation is applied in preference to a result of the first compressor speed regulation.

It may be that the refrigeration cycle is one of two refrigeration cycles which share the evaporator for cooling the internal cargo space, each refrigeration cycle comprising a separate compressor and condenser, each condenser being provided with an associated condenser fan, and wherein the method comprises:

selecting between (i) operating a single one and (ii) operating both of the compressors based on a cooling demand;

optionally selecting which compressor to operate based on an operating time parameter associated with each compressor when it is determined to operate a single one of the compressors.

The increase of the speed of the compressor may be applied by incrementally increasing a prior speed setting for each operating compressor, wherein each operating compressor is intended to mean each compressor which is selected to operate based on the cooling demand.

It may be that the control loop further comprises:

evaluating an in-flight criterion corresponding to an in-flight condition of the air-cargo transport refrigeration unit, comprising:

determining whether an acceleration of the air-cargo transport refrigeration unit corresponds to the in-flight condition based on a signal received from an accelerometer of the air-cargo transport refrigeration unit; and/or determining whether an altitude of the air-cargo transport refrigeration unit corresponds to the in-flight condition based on a signal received from an altimeter of the air cargo transport refrigeration unit;

when the evaluation is indicative of the air-cargo transport refrigeration unit being in the in-flight condition:

performing an in-flight condenser fan regulation in which the speed of the condenser fan is proportionally reduced from an earlier setting as set in any condenser fan regulation of the control loop; and/or performing an in-flight compressor speed regulation in which the speed of the compressor is set to a predetermined constant speed when it is determined that the discharge pressure is in the high-pressure range.

For example, the condenser fan speed may be proportionally reduced to 50% of the earlier setting.

According to a second aspect, there is disclosed a refrigeration module for an air-cargo transport refrigeration unit, the refrigeration module comprising:

a controller; and a refrigeration cycle comprising a compressor, a condenser for rejecting heat to ambient air and provided with a condenser fan, and an evaporator for cooling an internal cargo space of the air-cargo transport refrigeration unit;

wherein the controller is configured to carry out a method in accordance with any of the examples in accordance with the first aspect.

The refrigeration module may comprise two refrigeration cycles in accordance with the first aspect.

According to a third aspect there is also provided an air-cargo transport refrigeration unit comprising an internal cargo space and a refrigeration module in accordance with the second aspect.

According to a fourth aspect, there is provided a non-transitory computer-readable storage medium comprising instructions which, when executed by a processor, cause performance of a method in accordance with any of the examples in accordance with the first aspect.

According to a sixth aspect, there is disclosed another method of controlling an air-cargo transport refrigeration unit. The air-cargo transport refrigeration unit comprises an internal cargo space, and a refrigeration cycle comprising a compressor, a condenser for rejecting heat to ambient air and provided with a condenser fan, and an evaporator for cooling the internal cargo space.

The method comprises performing a control loop including:

a compressor speed regulation comprising regulating a speed of the compressor;

a condenser fan regulation comprising regulating a speed of the condenser fan;

evaluating an in-flight criterion corresponding to an in-flight condition of the air-cargo transport refrigeration unit, comprising:

determining whether an acceleration of the air-cargo transport refrigeration unit corresponds to the in-flight condition based on a signal received from an accelerometer of the air-cargo transport refrigeration unit; and/or determining whether an altitude of the air-cargo transport refrigeration unit corresponds to the in-flight condition based on a signal received from an altimeter of the air cargo transport refrigeration unit;

when the evaluation is indicative of the air-cargo transport refrigeration unit being in the in-flight condition:

performing an in-flight condenser fan regulation in which a speed of the condenser fan is proportionally reduced from an earlier setting as set in the condenser fan regulation of the control loop; and/or performing an in-flight compressor speed regulation in which a speed of the compressor is set to a predetermined constant speed when it is determined that a discharge pressure of a refrigerant of the refrigeration cycle is in a high-pressure range.

The controller(s) described herein may comprise a processor. The controller and/or the processor may comprise any suitable circuitry to cause performance of the methods described herein and as illustrated in the drawings. The controller or processor may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU), to perform the methods and or stated functions for which the controller or processor is configured.

The controller or the processor may comprise or be in communication with one or more memories that store that data described herein, and/or that store machine readable instructions (e.g. software) for performing the processes and functions described herein (e.g. determinations of parameters and execution of control routines).

The memory may be any suitable non-transitory computer readable storage medium, data storage device or devices, and may comprise a hard disk and/or solid state memory (such as flash memory). In some examples, the computer readable instructions may be transferred to the memory via a wireless signal or via a wired signal. The memory may be permanent non-removable memory or may be removable memory (such as a universal serial bus (USB) flash drive). The memory may store a computer program comprising computer readable instructions that, when read by a processor or controller, causes performance of the methods described herein, and/or as illustrated in the Figures. The computer program may be software or firmware or be a combination of software and firmware.

Except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

INTRODUCTION TO THE DRAWINGS

DETAILED DESCRIPTION

Figure 1:
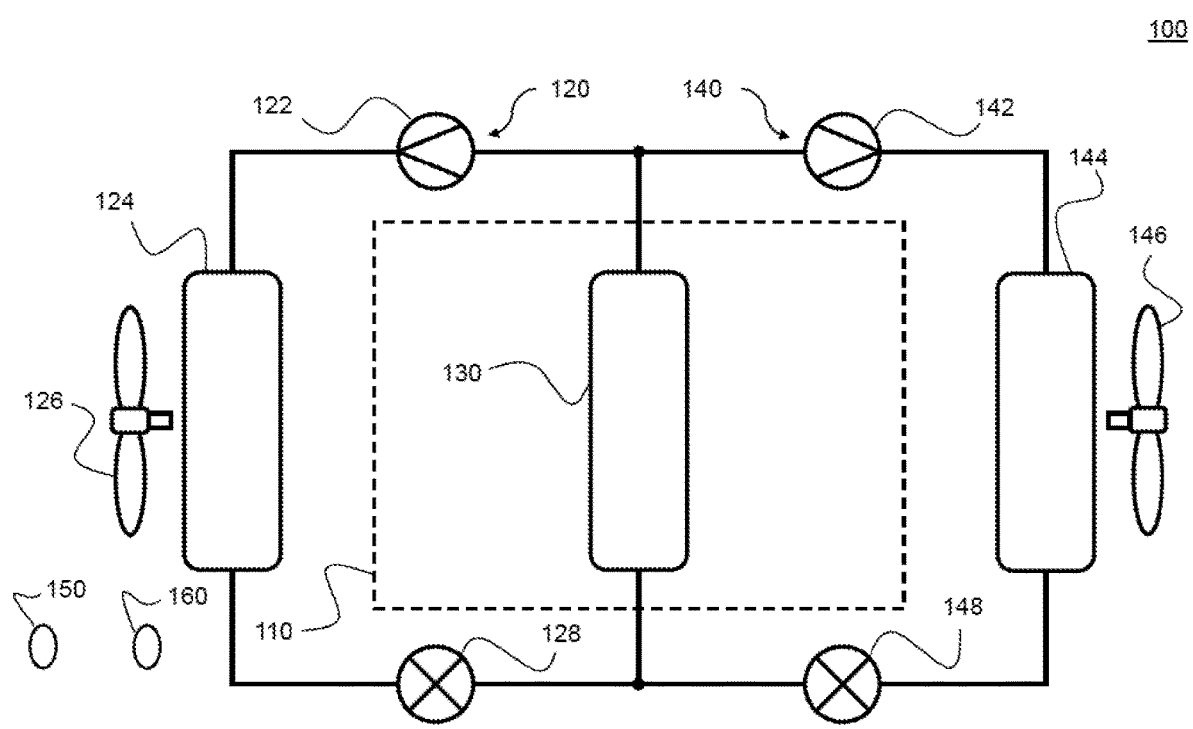
FIG. 1 shows an example air-cargo transport refrigeration unit.

FIG. 1 shows an example air-cargo transport refrigeration unit 100 comprising an internal cargo space 110 and a first refrigeration cycle 120. The refrigeration cycle 120 comprises in flow order a first compressor 122, a first condenser 124 for rejecting heat to ambient air, a first expansion valve 128 and an evaporator 130 for cooling the internal cargo space 110. The first condenser 124 is provided with a first condenser fan 126.

In the example of FIG. 1, there is both a first refrigeration cycle 120 and a second refrigeration cycle 140 which share the evaporator 130 as a common evaporator for cooling the internal cargo space 110. The second refrigeration cycle 140 comprises a second compressor 142, a second condenser 144 for rejecting heat to ambient air, a second expansion valve and the evaporator 130 for cooling the internal cargo space 110. The second condenser 144 is provided with a second condenser fan 146

Each refrigeration cycle comprises a separate compressor and condenser, but in this example flow through a common evaporator, for example along separate flow paths through the evaporator. It will be appreciated that a refrigeration unit according to the disclosure may alternatively have two refrigeration cycles each with their own respective evaporator or may have only a single refrigeration cycle such as the first refrigeration cycle 120.

Figure 2A:
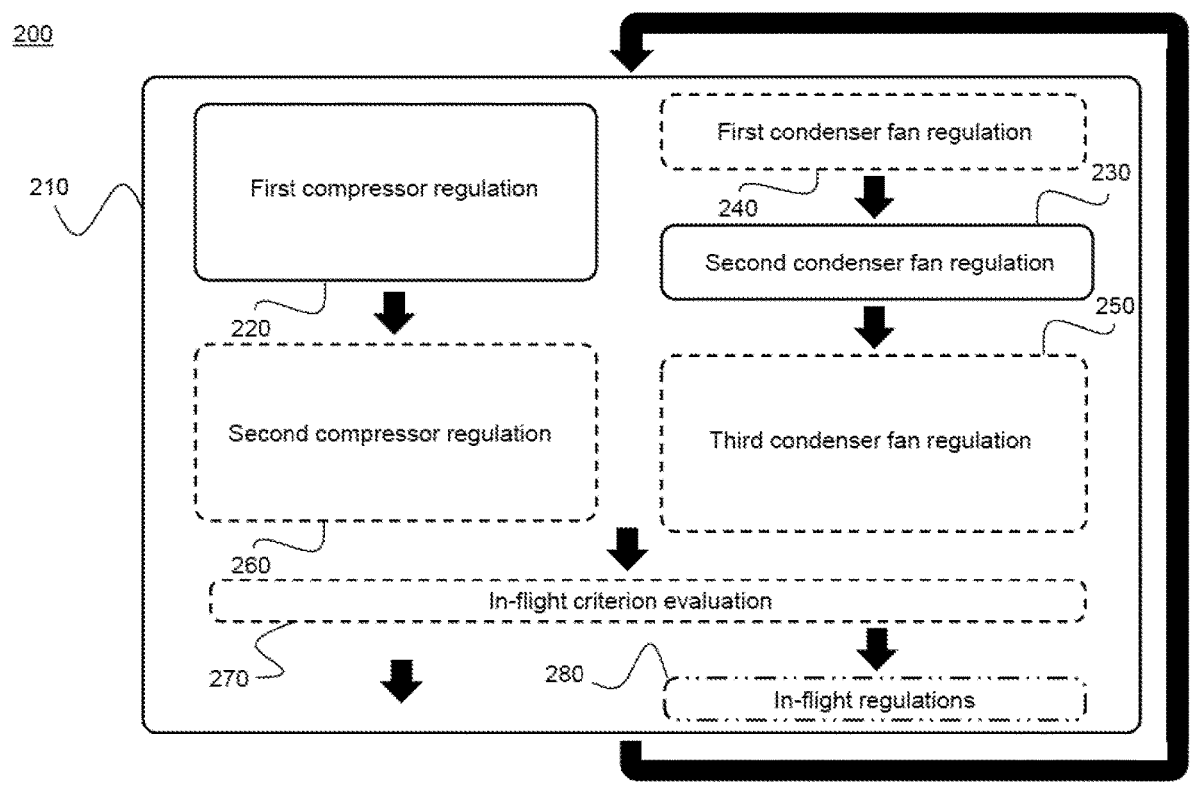
FIG. 2A is a flowchart showing an example method of controlling an air-cargo transport refrigeration unit.

FIG. 2A is a flowchart showing an example method 200 of controlling an air-cargo transport refrigeration unit. The air-cargo transport refrigeration unit may be in accordance with the example air-cargo transport refrigeration unit 100 described above and shown in FIG. 1.

The method 200 may be separate to a method of selectively activating and deactivating the or each refrigeration cycle of the air-cargo transport refrigeration unit, for example based on a set-point temperature for the internal cargo space. It may be that the or each refrigeration cycle is selectively activated or deactivated based on a determination that a monitored temperature of the internal cargo space is greater than the set-point temperature for the internal cargo space by a threshold value. For instance, it may be that the or each refrigeration cycle is operated in a temperature pull-down mode for cooling the internal cargo space when it is determined that the monitored temperature is greater than the set point temperature.

It may be that the or each refrigeration cycle is selectively activated or deactivated based on a difference between the monitored temperature of the internal cargo space and the set-point temperature for the internal cargo space. It may be that the or each refrigeration cycle is activated in response to a determination that the difference between the monitored temperature and the set-point temperature is greater than a dead-band threshold value. For example, it may be that the or each refrigeration cycle is operated in a temperature pull-down mode for cooling the internal cargo space when it is determined that the monitored temperature is greater than the set point temperature and the difference between the monitored temperature and the set-point temperature is greater than the dead-band threshold value. As a corollary, it may be that a cooling mode of the or each refrigeration cycle is deactivated when the monitored temperature is below the set-point temperature or when the difference between the monitored temperature and the set-point temperature is less than the dead-band threshold value.

Accordingly, the method 200 as described herein may not directly control whether or not the refrigeration cycle is operating in response to a demand for cooling but may control operating parameters of the refrigeration cycle for improved performance when it is operating, for example, in a temperature pull-down mode. It should be understood that any reference to the components of the first refrigeration cycle 120 or control thereof in the following description may apply equally to equivalent components of the second refrigeration cycle 140 and the control thereof, unless indicated otherwise.

The method comprises performing a control loop 210. The control loop 210 includes a compressor speed regulation 220 and a condenser fan regulation 230. The expression "regulation" is used herein to refer to a regulating action or control action for the respective component, and for example may include any of monitoring, calculation and actuation steps in order to cause a change in the control of the respective component based on monitoring an associated parameter. The compressor speed regulation 220 and the condenser fan regulation 230 may be executed sequentially or in parallel in the control loop 210. Preferably, the compressor speed regulation 220 and the condenser fan regulation 230 may be executed sequentially. More preferably, the condenser fan regulation 230 may be executed prior to the compressor speed regulation 220.

The compressor speed regulation 220 comprises monitoring a temperature in the internal cargo space of the air-cargo transport refrigeration unit (for example using a temperature sensor installed in the internal cargo space). The compressor speed regulation 220 further comprises regulating a speed of a compressor of a refrigeration cycle of the air-cargo transport refrigeration unit to maintain a rate of temperature decrease in the internal cargo space above a threshold rate during a temperature pulldown mode. The speed of the or each compressor is linked to a cooling capacity of the or each refrigeration cycle 120. For example, an increase in the speed of the or each compressor 122 causes an increase in the cooling capacity of the or each refrigeration cycle 120. Accordingly, the compressor speed regulation 220 is able to regulate the cooling capacity of the or each refrigeration cycle 120 to ensure that the internal temperature of the cargo space 110 decreases at an acceptable rate in the temperature pull-down mode.

The condenser fan regulation 230 comprises regulating a speed of a condenser fan of the refrigeration cycle of the air-cargo transport refrigeration unit based on monitoring a discharge pressure of a refrigerant of the refrigeration cycle. The discharge pressure of the refrigerant may be directly monitored using a pressure sensor located between the or each compressor 122 and the or each condenser 124. Otherwise, the discharge pressure of the refrigerant may be indirectly monitored by monitoring other thermodynamic properties of refrigerant between the and/or each compressor 122 and the or each condenser 124, and/or thermodynamic properties of ambient air.

Figure 2B:
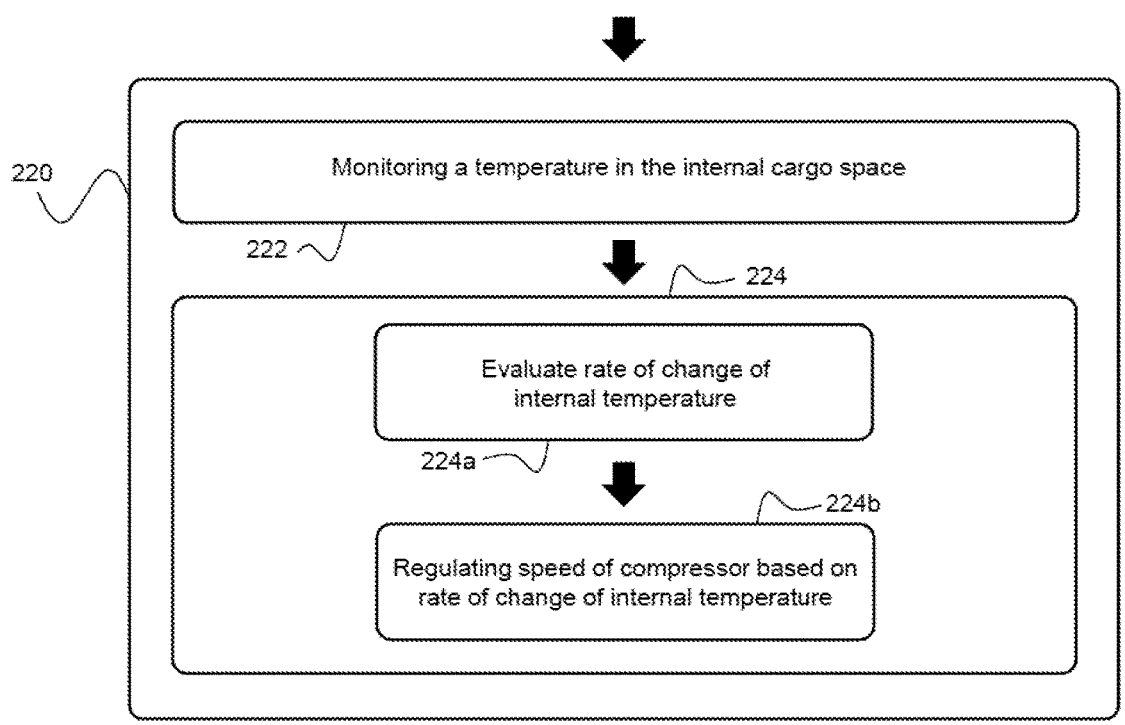
FIG. 2B is a flowchart showing an example implementation of a compressor speed regulation of the method shown in FIG. 2A in detail.

FIG. 2B is a flowchart showing an example implementation of the compressor speed regulation 220 of the control loop 210 with further detail of the step of regulating the speed of the compressor to maintain the rate of temperature decrease (block 224). At block 224a, the method includes evaluating a rate of change of the internal temperature based on temperature signals received from an internal temperature sensor at different times.

As an example, temperature signals may be received in sequence at periodic intervals governed by a refresh rate of the internal temperature sensor. The rate of change of the internal temperature may then be evaluated by dividing a difference between sequential temperature signals by a time period between receipt of sequential temperature signals. As another example, temperature signals may be received in sequence according to a selected sampling rate at respective sample times. The rate of change of internal temperature or the temperature slope may then be evaluated based on a difference between a temperature signal received at a first sampling time, a temperature signal received at a second sampling time and a time elapsed between the first sampling time and the second sampling time.

At block 224b, the method includes regulating a speed of the compressor based on the rate of change of the internal temperature.

Regulating the speed of the compressor may comprise incrementally increasing the speed of the compressor based on determining that the rate of temperature decrease is less than the threshold rate. The incremental increase applied to the speed of the compressor provides a relatively stable control regime for the compressor while in the temperature pull-down mode while ensuring adequate cooling to the internal cargo space.

Figure 2C:
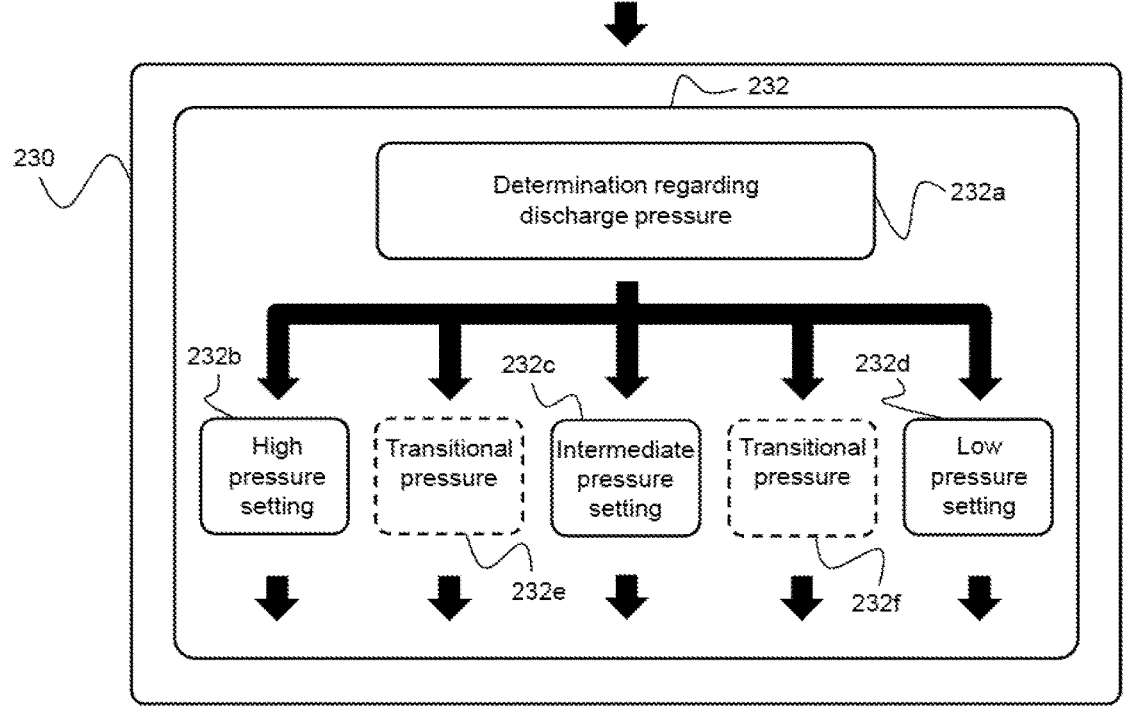
FIG. 2C is a flowchart showing an example implementation of a condenser fan regulation of the method shown in FIG. 2A in detail.

FIG. 2C is a flowchart showing an example implementation of the condenser fan regulation 230 of the control loop 210. The step of regulating a speed of the condenser fan based on monitoring a discharge pressure (block 232) may comprise a number of sub-steps. In the example shown in FIG. 2C, the method step comprises sub-block 232a, in which a determination is made with respect to the monitored discharge pressure. The method then proceeds to select between operation as described below and illustrated with reference to blocks 232b, 232c or 232d and optionally 232e or 232f.

At block 232b, the method comprises setting the speed of the condenser fan at a high condenser fan speed in response to a determination that the discharge pressure is in a high-pressure range. At block 232c, the method comprises setting the speed of the condenser fan at an intermediate condenser fan speed in response to a determination that the discharge pressure is in an intermediate pressure range between the high-pressure range and a low-pressure range. At block 232d, the method comprises setting the speed of the condenser fan at a low condenser fan speed in response to a determination that the discharge pressure is in the low-pressure range.

It may be that the high-pressure range, the intermediate-pressure range, and the low-pressure range do not overlap. The high-pressure range, the intermediate-pressure range and the low-pressure range may be contiguous. The high-pressure range, the intermediate-pressure range, and the low-pressure range may be delimited by a high operating pressure threshold (the lower limit of the high pressure range) and a low operating threshold (the upper limit of the low pressure range). Discharge pressures between the low operating threshold and the high operating threshold may correspond to particularly efficient operation of the compressor and/or the refrigeration cycle.

For example, if the discharge pressure is above the high operating pressure threshold, an amount of work done on the refrigerant by the compressor may be excessively high and lead to inefficient operation of the system. Such a situation may arise if there is insufficient heat rejection at the condenser, resulting in heat accumulation and a consequent rise in the condensing (saturation) temperature, and a commensurate rise in the pressure at the condenser, to which the discharge pressure from the compressor is directly related.

Setting the condenser fan speed at the high condenser fan speed increases the effectiveness of convective heat transfer from the condenser to ambient air. This results in a reduction in both the saturation (condensing) temperature and the pressure at the condenser, and a corresponding reduction of the discharge pressure. Accordingly, the work done on the refrigerant by the compressor reduces, while a work done on ambient air by the condenser fan increases by a lesser amount, improving the overall efficiency of the refrigeration cycle.

Further, there may be an operating envelope for the refrigeration cycle, which may be a function of performance characteristics of the components (in particular the compressor, condenser and evaporator) and the pressure-temperature relationship for the selected refrigerant. The operating envelope may correspond to an operating capability of the refrigeration cycle, and/or a particularly efficient set of operating conditions for the refrigeration cycle. The operating envelope may be delimited by minimum and maximum condensing temperatures, and minimum and maximum evaporating temperatures—these being the saturation temperature of the refrigerant at the condenser and evaporator respectively.

As discussed above, the condensing (saturation) temperature and discharge pressure may vary depending on whether there is sufficient heat rejection at the condenser. As ambient temperature reduces, heat rejection at the condenser may be enhanced which may result in a reduction in the condensing temperature below the operating envelope for the refrigeration cycle, with a commensurate reduction in the discharge pressure.

Reducing the condenser fan speed decreases the effectiveness of convective heat transfer from the condenser to ambient air and may therefore lead to an increase in the condensing (saturation) temperature and the discharge pressure as discussed above to maintain operation of the refrigeration cycle within the operating envelope. Conversely, insufficient heat rejection may result in the condensing (saturation) temperature rising to exceed the maximum defined by the operating envelope, with a commensurate rise in the discharge pressure. Accordingly, the condenser fan speed may be increased to increase convective heat transfer and maintain the condensing (saturation) temperature within the operating envelope for the refrigeration cycle.

Accordingly, by controlling the condenser fan speed based on discharge pressure as described may result in efficient operation of the refrigeration cycle, and maintenance of the refrigeration cycle within a predetermined operating envelope.

The high pressure range, the intermediate pressure range and the low pressure range may be non-contiguous, and there may be transitional ranges between them. Optionally, the method of regulating a speed of the condenser fan based on monitoring a discharge pressure may further comprise blocks 232e and/or 232f. At block 232e, the method comprises maintaining a prior setting of the condenser fan speed responsive to determining that the discharge pressure is in a transitional range between the low-pressure range and the intermediate pressure range. At block 232f, the method comprises maintaining a prior setting of the condenser fan speed responsive to determining that the discharge pressure is in a transitional range between the intermediate pressure range and the high-pressure range.

Accordingly, when the discharge pressure is in either of the transitional ranges, the condenser fan regulation 230 is prevented from adjusting an earlier setting corresponding to the discharge pressure being in an adjacent pressure range. The technical advantages of this example of the method 200 are explained with reference to FIG. 3.

Figure 3:
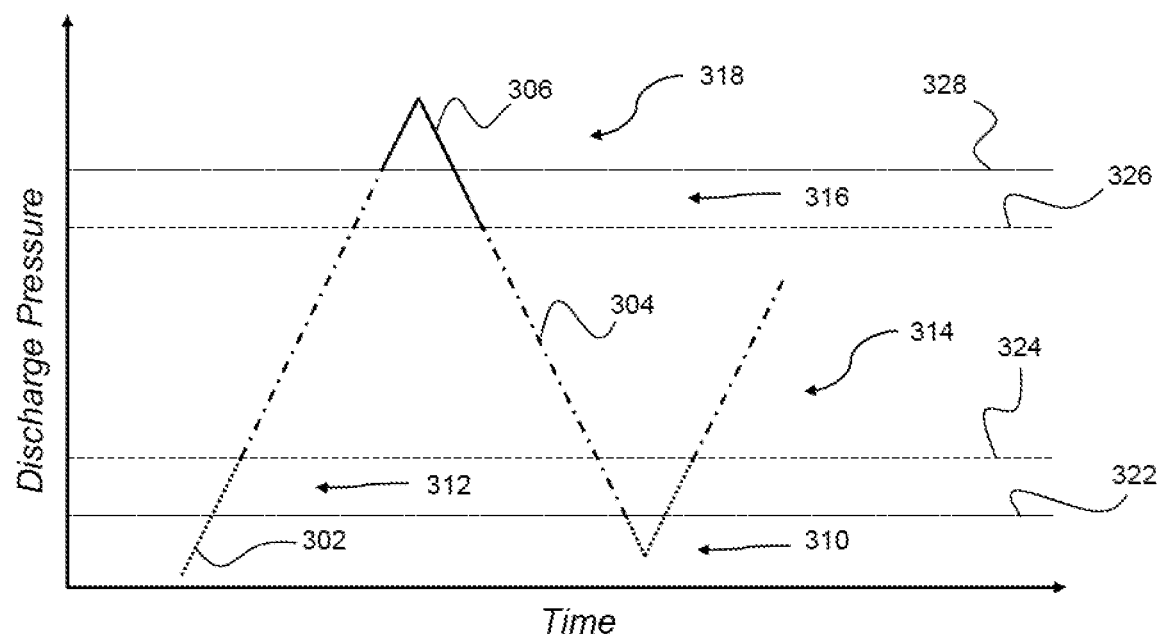
FIG. 3 is a graph showing an example of how a condenser fan speed may vary in response to a variable discharge pressure of a refrigerant of a refrigeration cycle.

FIG. 3 is a graph showing an example of how a condenser fan speed varies in accordance with an example implementation of the method 200 as the discharge pressure of a refrigerant of the refrigeration cycle 120 varies with time. The low-pressure range is denoted by reference numeral 310, the intermediate-pressure range is denoted by reference numeral 314 and the high-pressure range is denoted by reference numeral 318. In addition, a transitional range between the low-pressure range 310 and the intermediate-pressure range 314 is denoted by 312, while a transitional range between the intermediate-pressure range 314 and the high-pressure range 318 is denoted by 316.

In the example shown in FIG. 3, the low-pressure range is defined as the region beneath the low pressure operating threshold as represented by the short-dashed line 322. The intermediate pressure range is defined as the region between a low-pressure hysteresis threshold represented by the long-dashed line 324 and a high-pressure hysteresis threshold represented by the long-dashed line 326. The high-pressure range is defined as the region above the high pressure operating threshold as represented by the short-dashed line 328. The transitional range 312 between the low-pressure range 310 and the intermediate-pressure range 314 is defined as the region between the low pressure operating threshold 322 and the low-pressure hysteresis threshold 324, while the transitional range 316 between the intermediate-pressure range 314 and the high-pressure range 318 is defined as the region between the high-pressure hysteresis threshold 326 and the high pressure operating threshold 328.

The provision of the transitional range or transitional ranges and the maintenance of a prior setting of the condenser fan speed when the discharge pressure is within the transitional range(s) inhibits the condenser fan speed being adjusted owing to relatively minor fluctuations in discharge pressure about end points (i.e. bounding thresholds) of a respective low, intermediate or high pressure range. For example, if the discharge pressure was previously in the low-pressure range then the low speed setting may be maintained while the discharge pressures is in the transitional range until the discharge pressure increases to reach the intermediate range (as shown by the close-dashed line 302 representing low-speed operation extending through the lower transitional range 312). In contrast, if the discharge pressure was previously in the intermediate pressure range then the intermediate speed setting may be maintained while the discharge pressure is in the transitional range until the discharge pressure reaches the low-pressure range (as shown by the dash-dot line 304 representing intermediate speed operation extending through the lower transitional range 312).

It follows that the method 200 is able to reduce a number of condenser fan speed changes required under a variety of operating conditions. A high number of condenser fan speed changes is associated with reduced stability of the refrigeration cycle 124 and increased wear on drive components of the condenser fan 124. The method 200 may therefore increase stability of the refrigeration cycle 120 and reduces wear on drive components of the condenser fan 124.

Returning to the example shown by FIG. 2A, it may be that the condenser fan regulation 230 is a second condenser fan regulation 230 which is preceded in order of execution in the control loop 210 by an optional first condenser fan regulation 240. Accordingly, the control loop may comprise both the first condenser regulation 240 and the second condenser regulation 230, with the first condenser fan regulation 240 being performed prior to the second condenser fan regulation 230 within the control loop 210. Any action or result of the first condenser regulation 240 may be overwritten by the subsequent second condenser regulation 230, such that an action or a result of the second condenser regulation 230 is applied in preference to an action or a result of the first condenser regulation 240. As discussed above, the second condenser fan speed regulation 230 may determine to maintain at a prior setting (e.g. as set by the first condenser fan regulation or in an earlier iteration of the control loop), such that a prior setting is not overwritten.

The first condenser fan regulation 240 comprises regulating a speed of the condenser fan based on monitoring a temperature of the ambient air. The temperature of the ambient air may be directly monitored using an ambient temperature sensor for monitoring the temperature of the ambient air.

Figure 2D:
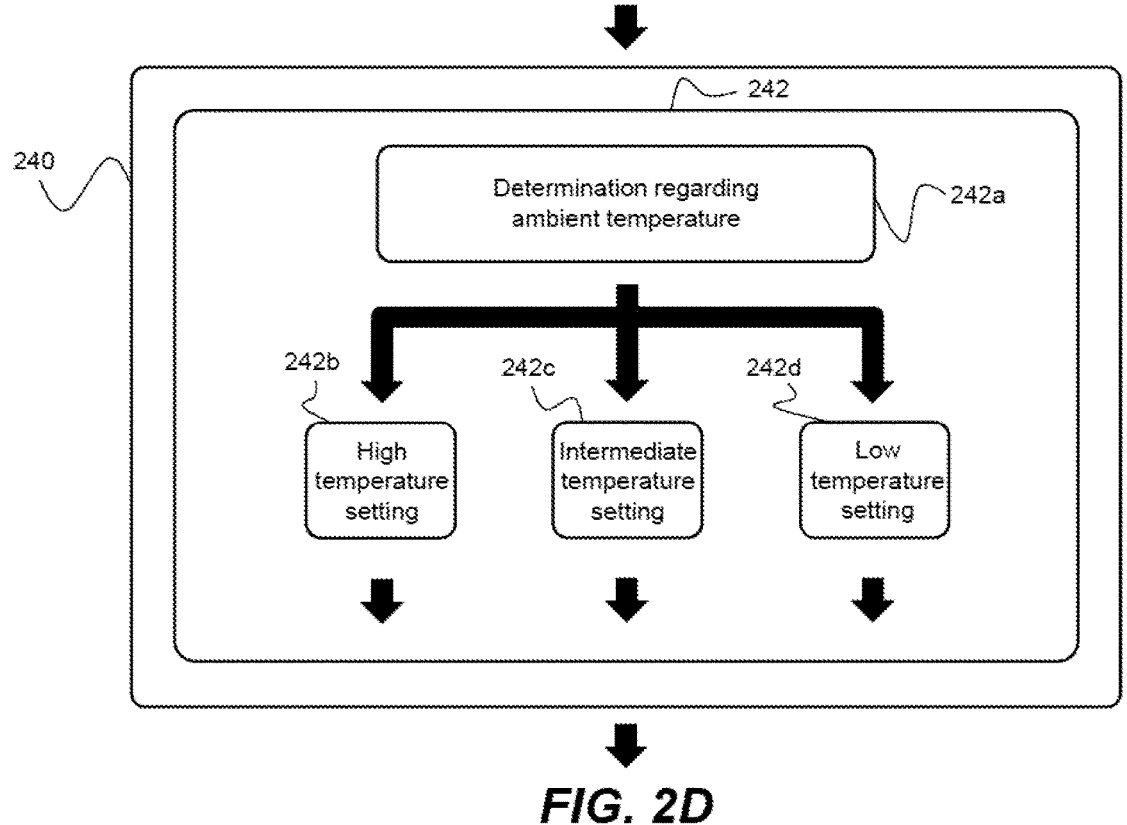
FIG. 2D is a flowchart showing an example implementation of an additional condenser fan regulation of the method shown in FIG. 2A in detail.

FIG. 2D is a flowchart showing an example implementation of the first condenser fan regulation 240 of the control loop 210 in further detail. The step of regulating a speed of the condenser fan based on monitoring a temperature of the ambient air (block 242) may comprise a number of substeps. In the example shown in FIG. 2D at block 242a a determination is made with respect to the monitored ambient temperature. The method then selectively proceeds to blocks 242b, 242c or 242d.

At block 242b, the method comprises setting the speed of the condenser fan at the high condenser fan speed in response to a determination that the ambient temperature is in a high-temperature range. At block 242c, the method comprises setting the speed of the condenser fan at an intermediate condenser fan speed in response to a determination that the ambient temperature is in an intermediate-temperature range between the high-temperature range and a low-temperature range. At block 242d, the method comprises setting the speed of the condenser fan at a low condenser fan speed in response to a determination that the ambient temperature is in the low-temperature range.

It may be that the high-temperature range, the intermediate-temperature range, and the low-temperature range do not overlap, and it may be that they are contiguous. The high-temperature range, the intermediate-temperature range, and the low-temperature range may be delimited by a high ambient temperature parameter and a low ambient temperature parameter. As described above, heat rejection at the condenser is a function of the temperature difference between the condensing (saturation) temperature and the temperature of the ambient air and a flow rate of air passed the condenser, with a rate of heat transfer increasing with increasing temperature difference, and increasing with increasing fan speed. Consequently, setting the condenser fan speed based on ambient temperature permits the resultant rate of heat transfer to be managed. As described above, this can prevent excess heat accumulation and increase of the discharge pressure (which leads to excessive compressor work) and can also maintain the refrigeration cycle within its operating envelope.

Returning once again to the example shown by FIG. 2A, it may be that the control loop 210 further comprises a third condenser fan regulation 250 which is preceded in order of execution in the control loop 210 by the first condenser fan regulation 240 and the second condenser fan regulation 230. The third condenser fan regulation 250 comprises evaluating a fault condition of an ambient temperature sensor for monitoring the temperature of the ambient air. The third condenser fan regulation 250 comprises setting the speed of the condenser fan at the high condenser fan speed when the evaluation is indicative of a fault associated with the ambient temperature sensor.

The third condenser fan regulation 250 ensures that adequate heat rejection from the or each condenser 124 to ambient air (and therefore adequate cooling to the internal cargo space) is maintained in the event of a fault in an ambient temperature sensor, despite a possible detrimental effect to the overall efficiency of the or each refrigeration cycle 120 (e.g. from running the condenser speed higher than optimal). This improves a reliability of the air-cargo transport refrigeration unit 100.

In addition, the third condenser fan regulation 250 ensures that the temperature of refrigerant in the condenser does not become very high in the event of an ambient temperature sensor fault and a high ambient air temperature, which in turn prevents a temperature at the or each condenser 124 from becoming very high and a commensurate rise in condensing (saturation) temperature and discharge pressure.

It may be that the compressor speed regulation 220 is a first compressor speed regulation 220, and the control loop 210 comprises a second compressor speed regulation 260 which is preceded in order of execution in the control loop 210 by the first compressor speed regulation 220. Accordingly, any action or result of the first compressor speed regulation 220 may be overwritten by the subsequent second compressor speed regulation 260, such that an action or a result of the second compressor speed regulation 260 is applied in preference to an action or a result of the first compressor speed regulation 220.

The second compressor speed regulation 260 comprises an evaluation of whether the air-cargo transport refrigeration unit 10 is in an extreme operating condition. The evaluation results in a determination that the air-cargo transportation unit 100 is in an extreme operating when the compressor speed is set to the high compressor speed and the temperature of the internal cargo space is above a threshold setting. When the extreme operating condition is determined, the second compressor speed regulation 260 comprises reducing the speed of the compressor. When the air-cargo transport refrigeration unit 100 is in the extreme operating condition, it may be that the compressor 122 is being operated to generate a large pressure ratio and to operate at a high speed. Accordingly, a total load on the compressor 122 may be very high when the air-cargo transport refrigeration unit 100 is in the extreme condition. A reduction in compressor speed when the air-cargo transport refrigeration unit 100 is in the extreme condition reduces the total load on the compressor, which in turn may cause the compressor to operate more efficiently and/or prevents components of the compressor from being subject to excessive wear.

In an example of the air-cargo transport refrigeration unit 100 which comprises both the first refrigeration cycle 120 and the second refrigeration cycle 140, the method 200 may further comprise a step of selecting which of the first compressor 122 and the second compressor 142 to operate based on a cooling demand of the air-cargo transport refrigeration unit 100. The cooling demand of the air-cargo transport may be based on, for example, a difference between the temperature of the ambient air and the temperature of the internal cargo space, a difference between the temperature of the internal cargo space and a temperature set-point, an indication of a type of cargo stored in the internal cargo space 110 and/or an indication of an amount of cargo stored in the internal cargo space 110.

The method 200 may comprise selecting to operate only a single one of the first compressor 122 and the second compressor 142 in response to a determination that the cooling demand is below a cooling demand threshold. Alternatively, the method 200 may comprise selecting to operate both of the first compressor 122 and the second compressor 142 in response to a determination that the cooling demand is above a cooling demand threshold. It may be advantageous to operate only a single one of the compressors when the cooling demand is relatively low, since operating both compressors when the cooling demand is low may cause each compressor to operate in a region corresponding to a relatively low efficiency on a respective operating map. On the other hand, operating only a single one of the compressors may cause the selected compressor to operate in a region corresponding to a relatively high efficiency on its operating map. Consequently, the overall efficiency of the air-cargo transport refrigeration unit 100 may be improved. Further, by only operating one compressor when possible, the total operating time of each compressor may be reduced for a given operational time of the air-cargo refrigeration unit.

Optionally, when operating only a single one of the first compressor 122 and the second compressor 142, the method may include selecting which compressor to operate based on an operating time parameter associated with each compressor. For example, the method 200 may comprise selecting to operate the compressor for which the associated operating time parameter indicates it has logged less operating time since installation and/or since a service interval. This reduces unequal use and wear, and reduces the likelihood that the first compressor 122 or the second compressor 142 will log excessive operating time since installation and/or between service intervals. It may therefore reduce the likelihood of premature failure due to wear of the first compressor 122 and/or the second compressor 142.

It may be that the control loop 210 further comprises an evaluation of an in-flight criterion, represented by block 270. The in-flight criterion corresponds to whether or not the air-cargo transport refrigeration unit 100 is in an in-flight condition (that is, the air-cargo transport refrigeration unit is being transported by means of an airborne aircraft).

The evaluation of the in-flight criterion comprises determining whether an acceleration of the air-cargo transport refrigeration unit 100 corresponds to the in-flight condition. The determination is based on a signal received from an accelerometer 150 of the air-cargo transport refrigeration unit 100. For instance, the determination may be based on a signal received from the accelerometer 150 corresponding to a take-off acceleration parameter or a landing acceleration parameter. The determination may be further based on a history of signals received from the accelerometer 150 of the air-cargo transport refrigeration unit 100. For example, the determination may be based on comparing the history of signals received from the accelerometer 150 with a profile of acceleration consistent with a take-off profile.

Additionally or alternatively, the evaluation of the in-flight criterion may comprise determining whether an altitude of the air-cargo transport refrigeration unit 100 corresponds to the in-flight condition, based on a signal received from an altimeter 160 of the air-cargo transportation unit 100. For instance, the determination may be based on a signal received from the altimeter 160 corresponding to an airborne altitude parameter. The determination may be further based on a history of signals received from the altimeter 160 of the air-cargo transport refrigeration unit 100. For example, the determination may be based on comparing the history of signals received from the altimeter 160 to an altitude profile consistent with a phase of flight, such as take-off or climb.

When the evaluation is indicative of the air-cargo transport refrigeration unit being in the in-flight condition, the method proceeds to block 280, in which in-flight regulations are performed. The in-flight regulations may comprise an in-flight condenser fan regulation, and an in-flight compressor speed regulation.

In the in-flight compressor speed regulation, the speed of the or each compressor 124 is set to a predetermined constant speed when it is determined that the discharge pressure is in the high-pressure range.

In the in-flight condenser fan regulation, the condenser fan speed is proportionally reduced from an earlier setting as set in any condenser fan regulation of the control loop. For example, the condenser fan speed may be proportionally reduced to 50% of an earlier setting of the condenser fan speed, or to 50% of the speed that would have been set when the in-flight condition is not determined.

As described elsewhere herein, a reduction in condenser fan speed may cause an increase in discharge pressure. The predetermined constant speed of the compressor may be selected to limit and/or offset an increase in the discharge pressure.

This ensures that an airflow generated by the or each condenser fan 126 within a cargo hold in which the air-cargo transport refrigeration unit may be disposed does not become excessively large. If the airflow generated by the or each condenser fan 126 within the cargo hold were to become excessively large, it may be that an air flow within a cargo hold of an aircraft is disrupted. For example, such a disruption may interfere with operation of safety alarms (e.g. temperature sensitive alarms related to fire detection) associated with the cargo-hold. Accordingly, the steps represented by blocks 270 and 280 provide that the method 200 and control loop 210 are more suitable for air-cargo transportation applications.

Figure 4:
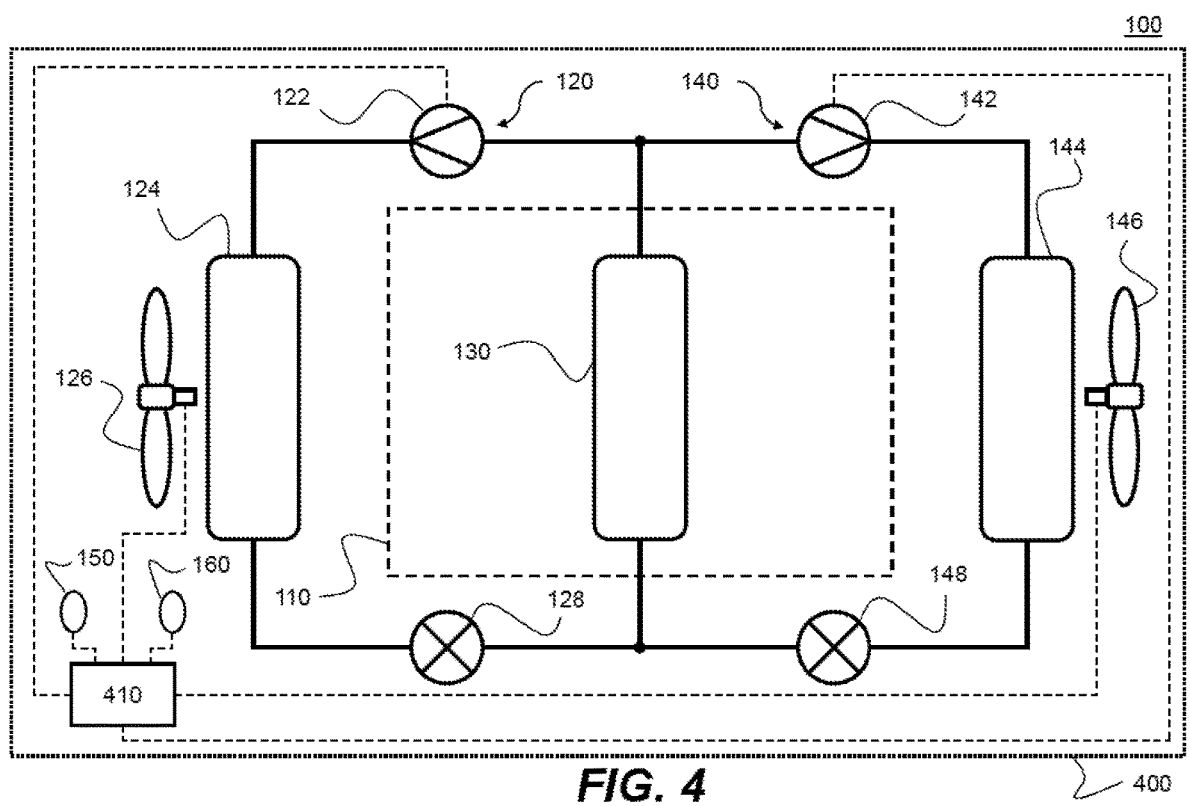
FIG. 4 shows an example refrigeration module for an air-cargo transport refrigeration unit.

FIG. 4 shows a refrigeration module 400 for an air-cargo transportation unit 100. The refrigeration module 400 comprises a controller 410, a first refrigeration cycle 120 and a second refrigeration cycle 140. The first refrigeration cycle 120 and the second refrigeration cycle 140 may be in accordance with the cycles described with respect to FIG. 1 above, with like reference numerals indicating common components.

As described with reference to FIG. 1, each refrigeration cycle comprises a separate compressor and condenser but in this example flow through a common evaporator, for example along separate flow paths through the evaporator. It will be appreciated that a refrigeration unit according to the disclosure may alternatively have two refrigeration cycles each with their own respective evaporator or may have only a single refrigeration cycle such as the first refrigeration cycle 120.

The controller 410 may comprise a processor and a non-transitory storage medium The non-transitory computer-readable storage medium may comprise instructions which, when executed by the processor, cause performance of the method 200 in accordance with any of the examples described above.

Figure 5:
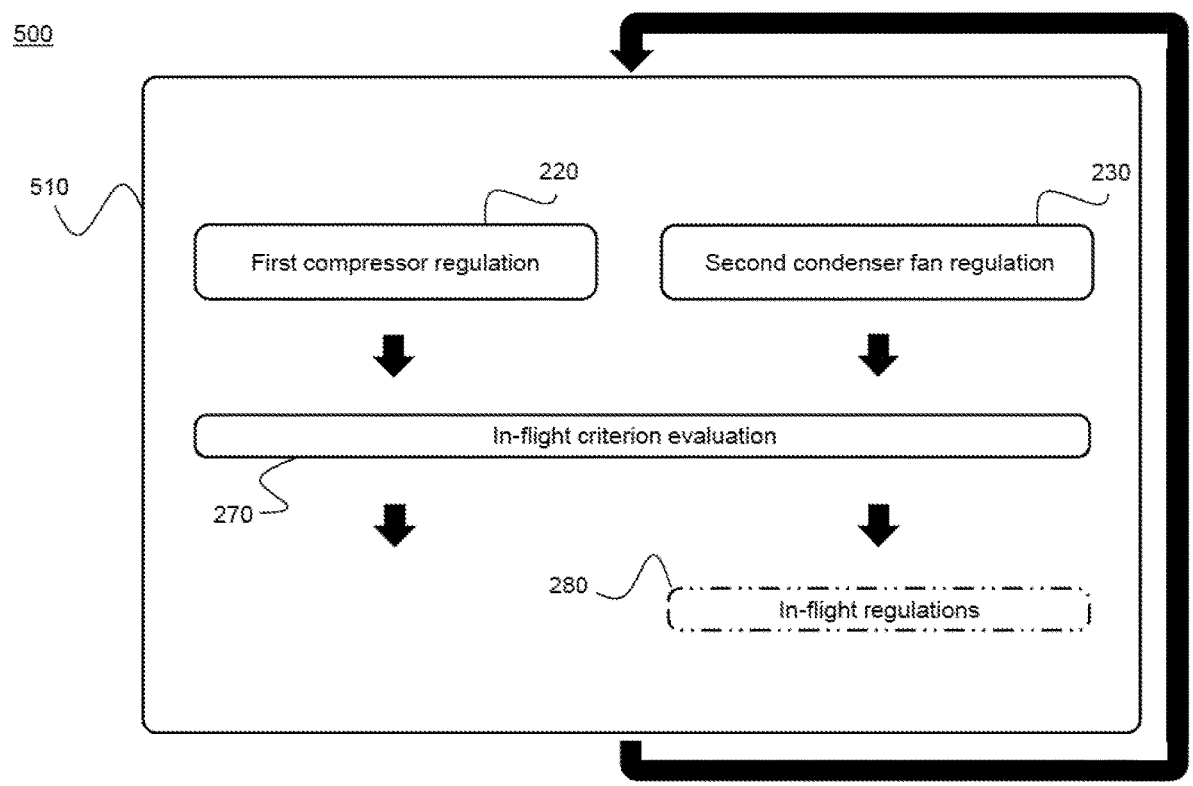
FIG. 5 is a flowchart showing another example method of controlling an air-cargo transport refrigeration unit.

FIG. 5 is a flowchart showing another example method 500 of controlling an air-cargo transport refrigeration unit. The air-cargo transport refrigeration unit may be in accordance with the example air-cargo transport refrigeration unit 100 described above and shown in FIG. 1.

The method comprises performing a control loop 510. The control loop 510 includes a compressor speed regulation 220 and a condenser fan regulation 230. As described with respect to FIG. 2A, the expression "regulation" is used to refer to a regulating action or control action for the respective component, and for example may include any of monitoring, calculation and actuation steps in order to cause a change in the control of the respective component based on monitoring an associated parameter. The compressor speed regulation 220 and the condenser fan regulation 230 are in accordance with, and are therefore associated with the advantages of, any of the examples described above with respect to FIG. 2A, FIG. 2B and/or FIG. 2C.

The control loop 510 further comprises an evaluation of an in-flight criterion, represented by block 270. The evaluation of the in-flight criterion is in accordance with any of the examples describe above with respect to FIG. 2A. When the evaluation is indicative of the air-cargo transport refrigeration unit being in the in-flight condition, the method proceeds to block 280, in which in-flight regulations are performed. The in-flight regulations are in accordance with, and are therefore associated with the advantages of, any of the examples described above with respect to FIG. 2A.

The invention claimed is:

1. A method of controlling an air-cargo transport refrigeration unit comprising: an internal cargo space, and a refrigeration cycle comprising a compressor, a condenser for rejecting heat to ambient air and provided with a condenser fan, and an evaporator for cooling the internal cargo space;
the method comprising performing a control loop including:
a compressor speed regulation comprising:
monitoring a temperature in the internal cargo space;
regulating a speed of the compressor to maintain a rate of temperature decrease in the internal cargo space above a threshold rate during a temperature pulldown mode;
a first condenser fan regulation comprising regulating a speed of the condenser fan based on monitoring a temperature of the ambient air; and
a second condenser fan regulation comprising:
regulating a speed of the condenser fan based on monitoring a discharge pressure of a refrigerant of the refrigeration cycle,
wherein within the control loop, the first condenser fan regulation is performed prior to the second condenser fan regulation, such that a result of the second condenser fan regulation is applied in preference to a result of the first condenser fan regulation.

2. The method according to claim 1, wherein regulating the speed of the compressor to maintain the rate of temperature decrease comprises:
evaluating a rate of change of the internal temperature based on temperature signals received from an internal temperature sensor at different times; and
regulating a speed of the compressor based on the rate of change of the internal temperature.

3. The method according to claim 1, wherein regulating the speed of the compressor to maintain the rate of temperature decrease includes:
increasing the speed of the compressor based on determining that the rate of temperature decrease is less than the threshold rate.

4. The method according to claim 1, wherein regulating a speed of the condenser fan based on monitoring a discharge pressure comprises:
setting the speed of the condenser fan at a high condenser fan speed in response to a determination that the discharge pressure is in a high-pressure range;
setting the speed of the condenser fan at a low condenser fan speed in response to a determination that the discharge pressure is in a low-pressure range; and
setting the speed of the condenser fan at an intermediate condenser fan speed in response to a determination that the discharge pressure is in an intermediate-pressure range between the low-pressure range and the high-pressure range.

5. The method according to claim 4, wherein regulating a speed of the condenser fan based on monitoring a discharge pressure further comprises:

maintaining a prior setting of the condenser fan speed responsive to determining that the discharge pressure is in a transitional range between the low-pressure range and the intermediate pressure range; and/or
maintaining a prior setting of the condenser fan speed responsive to determining that the discharge pressure is in a transitional range between the intermediate pressure range and the high-pressure range;
whereby when the discharge pressure is in the transitional range or one of the transitional ranges, the condenser fan pressure regulation is prevented from adjusting an earlier setting corresponding to the discharge pressure being in an adjacent pressure range.

6. The method according to claim 4, wherein the first condenser fan regulation comprises:
setting the speed of the condenser fan at the high condenser fan speed in response to a determination that the ambient temperature is in a high-temperature range;
setting the speed of the condenser fan at the low condenser fan speed in response to a determination that the ambient temperature is in a low-temperature range; and
setting the speed of the condenser fan at the intermediate condenser fan speed in response to a determination that the ambient temperature is in an intermediate-temperature range between the low temperature range and the high temperature range.

7. The method according to claim 4, further comprising a third condenser fan regulation comprising:
evaluating a fault condition of an ambient temperature sensor for monitoring the temperature of the ambient air;
setting the speed of the condenser fan at the high condenser fan speed when the evaluation is indicative of a fault associated with the ambient temperature sensor
wherein within the control loop, the third condenser fan regulation is performed following the second condenser fan regulation, such that a result of the third condenser fan regulation is applied in preference to a result of the second condenser speed regulation.

8. The method according to claim 1, wherein the compressor speed regulation is a first compressor speed regulation, and wherein the control loop further comprises a second compressor speed regulation comprising:
evaluating whether the air-cargo transport refrigeration unit is in an extreme operating condition in which the compressor speed is set to a first compressor speed and the temperature of the internal cargo space is above a threshold setting;
reducing the speed of the compressor when the extreme operating condition is determined;
wherein within the control loop, the first compressor speed regulation is performed prior to the second compressor speed regulation, such that a result of the second compressor speed regulation is applied in preference to a result of the first compressor speed regulation.

9. The method according to claim 1, wherein the refrigeration cycle is one of two refrigeration cycles which share the evaporator for cooling the internal cargo space, each refrigeration cycle comprising a separate compressor and condenser, each condenser being provided with an associated condenser fan, and wherein the method comprises:
selecting between (i) operating a single one and (ii) operating both of the compressors based on a cooling demand;

optionally selecting which compressor to operate based on an operating time parameter associated with each compressor when it is determined to operate a single one of the compressors.

10. The method according to claim 9,
wherein regulating the speed of the compressor to maintain the rate of temperature decrease includes:
increasing the speed of the compressor based on determining that the rate of temperature decrease is less than the threshold rate; and
wherein the increase of the speed of the compressor is applied by:
incrementally increasing a prior speed setting for each operating compressor.

11. The method according to claim 1, wherein the control loop further comprises:
evaluating an in-flight criterion corresponding to an in-flight condition of the air-cargo transport refrigeration unit, comprising:
determining whether an acceleration of the air-cargo transport refrigeration unit corresponds to the in-flight condition based on a signal received from an accelerometer of the air-cargo transport refrigeration unit; and/or
determining whether an altitude of the air-cargo transport refrigeration unit corresponds to the in-flight condition based on a signal received from an altimeter of the air cargo transport refrigeration unit;
when the evaluation is indicative of the air-cargo transport refrigeration unit being in the in-flight condition:
performing an in-flight condenser fan regulation in which the speed of the condenser fan is proportionally reduced from an earlier setting as set in any condenser fan regulation of the control loop; and/or
performing an in-flight compressor speed regulation in which the speed of the compressor is set to a predetermined constant speed when it is determined that the discharge pressure is in the high-pressure range.

12. A refrigeration module for an air-cargo transport refrigeration unit, the refrigeration module comprising:
a controller; and
a refrigeration cycle comprising a compressor, a condenser for rejecting heat to ambient air and provided with a condenser fan, and an evaporator for cooling an internal cargo space of the air-cargo transport refrigeration unit;
wherein the controller is configured to performing a control loop including:
a compressor speed regulation comprising:
monitoring a temperature in the internal cargo space;
regulating a speed of the compressor to maintain a rate of temperature decrease in the internal cargo space above a threshold rate during a temperature pulldown mode;
a first condenser fan regulation comprising regulating a speed of the condenser fan based on monitoring a temperature of the ambient air; and
a second condenser fan regulation comprising:
regulating a speed of the condenser fan based on monitoring a discharge pressure of a refrigerant of the refrigeration,
wherein within the control loop, the first condenser fan regulation is performed prior to the second condenser fan regulation, such that a result of the second condenser fan regulation is applied in preference to a result of the first condenser fan regulation.

13. The refrigeration module according to claim 12, wherein regulating a speed of the condenser fan based on monitoring a discharge pressure comprises:
setting the speed of the condenser fan at a high condenser fan speed in response to a determination that the discharge pressure is in a high-pressure range;
setting the speed of the condenser fan at a low condenser fan speed in response to a determination that the discharge pressure is in a low-pressure range; and
setting the speed of the condenser fan at an intermediate condenser fan speed in response to a determination that the discharge pressure is in an intermediate-pressure range between the low-pressure range and the high-pressure range.

14. The refrigeration module according to claim 12, wherein the compressor speed regulation is a first compressor speed regulation, and wherein the control loop further comprises a second compressor speed regulation comprising:
evaluating whether the air-cargo transport refrigeration unit is in an extreme operating condition in which the compressor speed is set to a first compressor speed and the temperature of the internal cargo space is above a threshold setting;
reducing the speed of the compressor when the extreme operating condition is determined;
wherein within the control loop, the first compressor speed regulation is performed prior to the second compressor speed regulation, such that a result of the second compressor speed regulation is applied in preference to a result of the first compressor speed regulation.

15. A method of controlling an air-cargo transport refrigeration unit comprising: an internal cargo space, and a refrigeration cycle comprising a compressor, a condenser for rejecting heat to ambient air and provided with a condenser fan, and an evaporator for cooling the internal cargo space;
the method comprising performing a control loop including:
a compressor speed regulation comprising regulating a speed of the compressor;
a condenser fan regulation comprising regulating a speed of the condenser fan;
evaluating an in-flight criterion corresponding to an in-flight condition of the air-cargo transport refrigeration unit, comprising:
determining whether an acceleration of the air-cargo transport refrigeration unit corresponds to the in-flight condition based on a signal received from an accelerometer of the air-cargo transport refrigeration unit; and/or
determining whether an altitude of the air-cargo transport refrigeration unit corresponds to the in-flight condition based on a signal received from an altimeter of the air cargo transport refrigeration unit;
in response to the evaluation being indicative of the air-cargo transport refrigeration unit being in the in-flight condition:
performing an in-flight compressor speed regulation in which a speed of the compressor is set to a predetermined constant speed when it is determined that a discharge pressure of a refrigerant of the refrigeration cycle is in a high-pressure range.

16. The method of claim 15, further comprising, when the evaluation is indicative of the air-cargo transport refrigeration unit being in the in-flight condition, performing an in-flight condenser fan regulation in which a speed of the condenser fan is proportionally reduced from an earlier setting as set in the condenser fan regulation of the control loop.

\* \* \* \* \*